US011290194B1

(12) United States Patent
Wurtenberger et al.

(10) Patent No.: US 11,290,194 B1
(45) Date of Patent: Mar. 29, 2022

(54) RECEIVER PATH IGNORE BASED ON PASSIVE INTERMODULATION

(71) Applicant: T-Mobile Innovations LLC, Overland Park, KS (US)

(72) Inventors: Andrew M. Wurtenberger, Olathe, KS (US); Sreekar Marupaduga, Overland Park, KS (US); Patrick J. Schmidt, Basehor, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 14/884,942

(22) Filed: Oct. 16, 2015

(51) Int. Cl.
*H04B 15/00* (2006.01)
*H04B 7/26* (2006.01)
*H04L 12/26* (2006.01)
*H04L 43/16* (2022.01)

(52) U.S. Cl.
CPC ........... *H04B 15/00* (2013.01); *H04B 7/2603* (2013.01); *H04L 43/16* (2013.01)

(58) Field of Classification Search
CPC .... H04B 17/0085; H04B 17/14; H04B 17/11; H04B 17/17; H04B 1/1036; H04B 1/525; H04L 43/50; H04L 5/0037; H04L 5/0091; H04W 84/047; H04W 72/082; H04W 72/0453; H04W 16/10; H04W 52/38
See application file for complete search history.

(56) References Cited

U.S. PATENT DOCUMENTS

| | | | | |
|---|---|---|---|---|
| 7,251,459 | B2 * | 7/2007 | McFarland | H03H 7/0153 455/101 |
| 9,461,696 | B1 * | 10/2016 | Baker | H04L 1/0078 |
| 2004/0203398 | A1 * | 10/2004 | Durrant | H04W 16/10 455/63.1 |
| 2011/0249576 | A1 * | 10/2011 | Chrisikos | H01Q 1/243 370/252 |
| 2012/0236735 | A1 * | 9/2012 | Nory | H04W 52/365 370/252 |
| 2013/0273861 | A1 * | 10/2013 | See | H04B 1/44 455/83 |
| 2013/0310090 | A1 * | 11/2013 | Bevan | H04B 1/10 455/501 |
| 2013/0322395 | A1 * | 12/2013 | Kazmi | H04W 72/082 370/329 |
| 2014/0119197 | A1 * | 5/2014 | Maca | H04B 17/0085 370/241 |
| 2015/0257165 | A1 * | 9/2015 | Gale | H04B 1/1036 370/329 |

* cited by examiner

*Primary Examiner* — Jianxun Yang

(57) ABSTRACT

A device, method, and computer-readable medium are provided for detecting and mitigating signal interference due to passive intermodulation at a base station. Generally, when antennas are configured to transmit at two or more different bands or frequencies, particular combinations of frequencies can introduce passive intermodulation at one of the corresponding receive bands or frequencies. Passive intermodulation is exacerbated, in some instances, due to the presence of non-linearities in the RF path. Embodiments can be configured to automatically detect the presence of passive intermodulation in one of the receive bands or frequencies and dynamically mitigate the affected receive signal to maintain optimal system performance.

12 Claims, 4 Drawing Sheets

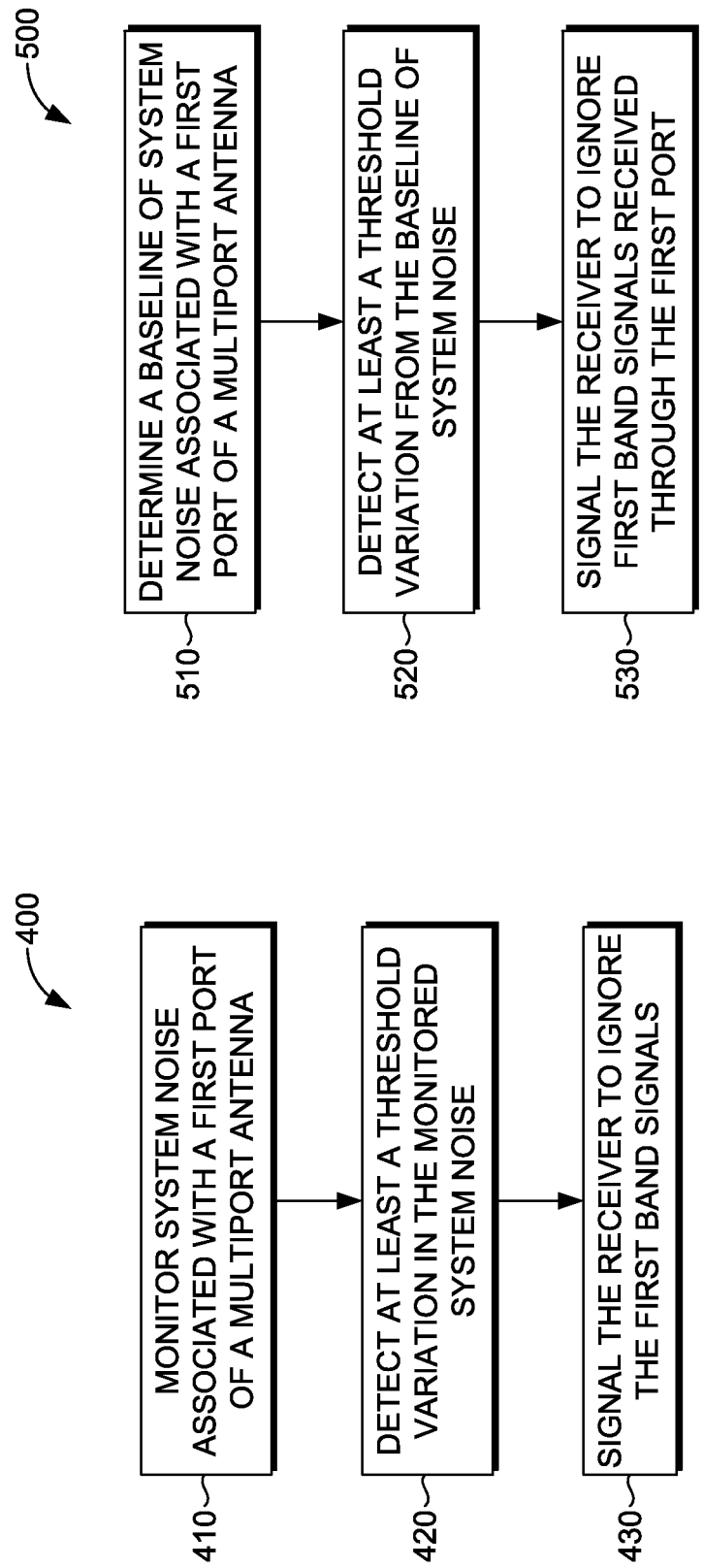

RECEIVER PATH IGNORE BASED ON PASSIVE INTERMODULATION

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, mitigating signal interference in a receive band of a multiband antenna due to passive intermodulation (PIM). Utilizing embodiments hereof, signal interference in a receive band of a multiband antenna due to passive intermodulation can be automatically detected and mitigated without interrupting radio frequency (RF) transmissions. In this way, the costs typically associated with mitigating PIM interference (e.g., radio transmission downtime and fees related to troubleshooting and repair) can be substantially reduced.

In some embodiments described herein, system noise associated with at least a first port of an antenna having a plurality of ports can be monitored continuously or intermittently. Each port of the antenna can be configured to receive signals associated with a first frequency to a receiver. The first port, and other ports in some configurations, can also be configured to receive signals associated with a second frequency to the receiver. A predetermined threshold variation in the monitored system noise associated with the first port of the antenna can be detected. In accordance with detecting at least the threshold variation in the monitored system noise associated with the first port of the antenna, a signal or instruction can be communicated to the receiver, causing the receiver to ignore the signals associated with the first frequency.

In other embodiments described herein, a baseline of system noise associated with at least a first port of an antenna having a plurality of ports is determined by averaging a plurality of system noise measurements corresponding to the first port upon one of a predefined interval basis or a continuous basis. Each port of the antenna can be configured to communicate signals associated with a first frequency to a receiver. The first port, and other ports in some configurations, can be also configured to communicate signals associated with a second frequency to the receiver. A measurement of system noise associated with the first port of the antenna exceeding a threshold variation can be detected. In accordance with detecting that the system noise associated with the first port exceeds the threshold variation, the receiver can be instructed to ignore the signals associated with the first frequency received through the first port of the antenna.

BRIEF DESCRIPTION OF THE SEVERAL VIEWS OF THE DRAWINGS

Illustrative embodiments of the present disclosure are described in detail below with reference to the attached drawing figures, and wherein:

FIG. 4 provides an exemplary method for mitigating signal interference attributed to passive intermodulation, in accordance with embodiments of the present disclosure; and FIG. 5 provides an exemplary method for mitigating signal interference attributed to passive intermodulation, in accordance with embodiments of the present disclosure.

DETAILED DESCRIPTION

Figure 1:
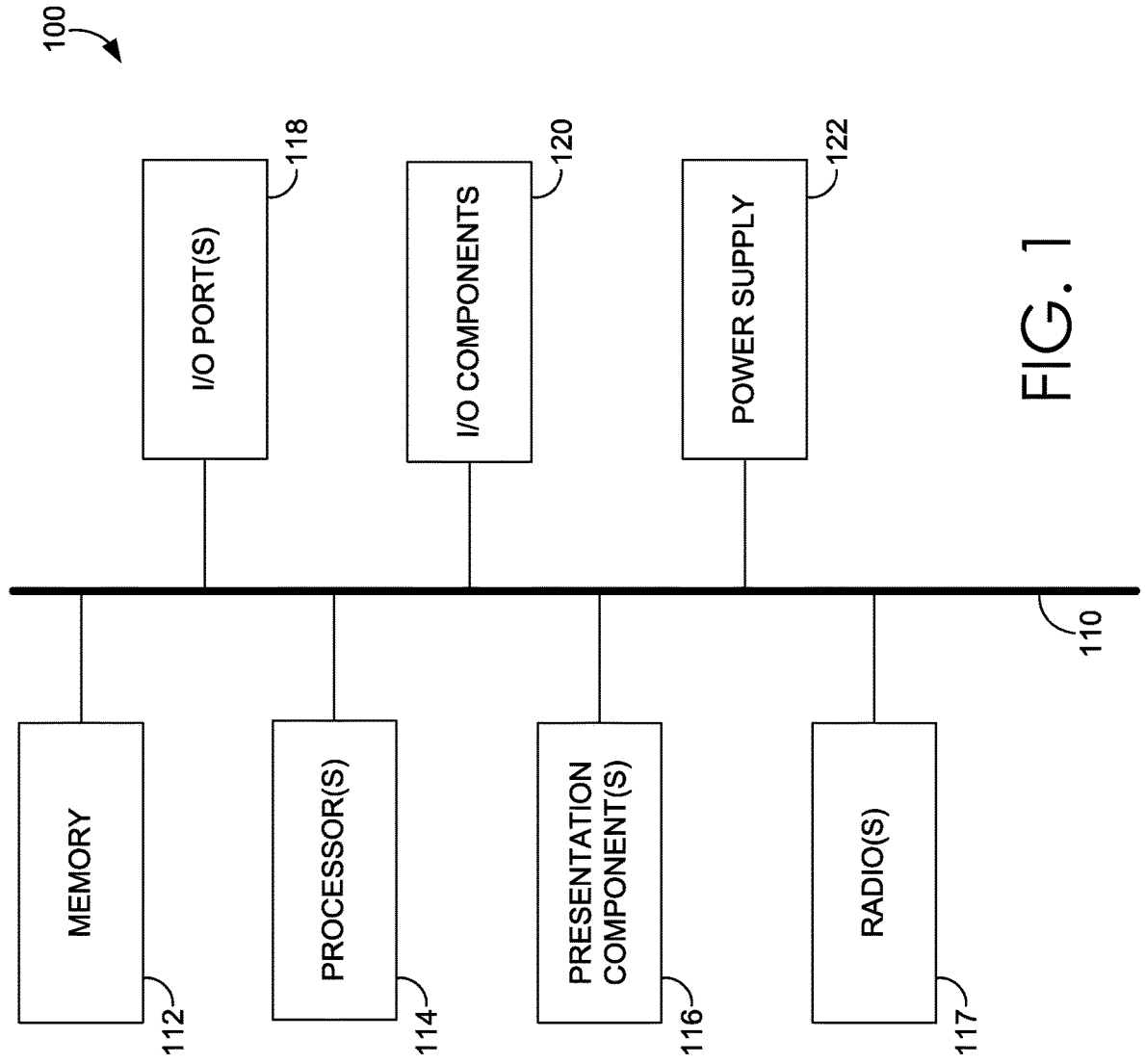
FIG. 1 depicts an exemplary computing device according to embodiments of the present disclosure.

The subject matter of select embodiments provided in the present disclosure is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| CD-ROM | Compact Disk Read Only Memory |
| CDMA | Code Division Multiple Access |
| eNodeB | Evolved Node B |
| GIS | Geographic/Geographical/Geospatial Information System |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| IM | Intermodulation |
| LED | Light Emitting Diode |
| LTE | Long Term Evolution |
| MD | Mobile Device |
| PC | Personal Computer |
| PCS | Personal Communications Service |
| PDA | Personal Digital Assistant |
| PIM | Passive Intermodulation |
| RAM | Random Access Memory |
| RET | Remote Electrical Tilt |
| RF | Radio-Frequency |
| RNR | Reverse Noise Rise |
| ROM | Read Only Memory |
| RSRP | Reference Signal Receive Power |
| RSRQ | Reference Signal Receive Quality |
| RSSI | Received Signal Strength Indicator |
| SINR | Signal-to-Interference-Plus-Noise Ratio |
| SNR | Signal-to-noise ratio |
| SON | Self-Organizing Networks |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 26th Edition (2011).

Embodiments of our technology may be embodied as, among other things, a device, method, system, or computer-program product. Accordingly, the embodiments may take the form of a hardware embodiment, or an embodiment combining software and hardware. One embodiment described herein takes the form of a computer-program product that includes computer-useable instructions embodied on one or more computer-readable media.

Computer-readable media includes both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings in general, and initially to FIG. 1 in particular, a block diagram of an illustrative computing device according to one embodiment is provided and referenced generally by the numeral 100. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, in some configurations, antennas can include multiple antenna elements that can be separated into independent portions coupled to a radio or receiver via independent paths to collectively provide diversity reception of the signals. Diversity reception, in most configurations, can provide optimal signal quality and strength by receiving and combining a plurality of signals from a plurality of independent antenna elements. Diversity reception, in some configurations, can be achieved by placing a plurality of antennas in various positions and utilizing the signal from whichever antenna is receiving the maximum signal at any given time. Diversity reception can also be facilitated with independent antenna elements of a single antenna, wherein the elements are configured to independently receive the same or substantially similar radio signals, which are then communicated to a receiver. By way of example, multiport antennas, such as the multiport antenna of FIG. 3, can be configured with a plurality of antenna elements, each antenna element being coupled to a corresponding antenna port. Each antenna port can further be connected to a radio or receiver through independent paths, so that the radio or receiver can combine the independent signals to maximize signal strength and quality.

Moreover, antennas of the standard and multiport variety can be configured to operate on more than one frequency. For instance, and by way of example only, one or more antenna elements can be configured to operate on both an LTE band frequency and a CDMA band frequency. By way of example, a multiport antenna (for instance, multiport antenna of FIG. 3) can include a plurality of antenna elements, each element being coupled to independent ports and paths. Each element, in one exemplary configuration, can be configured to transmit on at least a common LTE band and a unique CDMA band. In this regard, each element and corresponding port can be configured to transmit and receive using the common LTE band (e.g., LTE frequency 1 for transmit and LTE frequency 1' for receive), and also configured to transmit/receive on a unique CDMA band (e.g., CDMA frequency 1/1', CDMA frequency 2/2', CDMA frequency 3/3' and CDMA frequency 4/4'), respectively.

When an antenna element radiates signals on two or more transmit frequencies (for instance, LTE frequency 1 and CDMA frequency 1), non-linearities present in the radio frequency (RF) path can inadvertently generate passive intermodulation (PIM) frequencies that could potentially interfere with at least one of the respective receive frequencies (for instance, LTE frequency 1'). Non-linearities, as one of ordinary skill can appreciate, may be present or may gradually develop in the materials or junctions of the RF path.

Linear junctions, as one of ordinary skill in the art may appreciate, are otherwise defined as clean, solid connections between two metal surfaces that facilitate a linear progression of current in association with an applied voltage. Non-linear junctions, on the other hand, are connections where the current-voltage relationship resulting therefrom is non-linear. For instance, a non-linear junction can be created by, among other things, low-pressure metal-to-metal contacts, oxide layers on metal surfaces preventing solid metal-to-metal contact, or misaligned surfaces that can introduce electrical arcing therebetween. At a cell site particularly, non-linear junctions can come from, by way of example only, poorly terminated RF connectors, metal flakes inside connectors (i.e., due to poor manufacturer quality control or component degradation), loose RF connectors, rooftop metal flashing, loose rivets or screws, rusty or corroded surfaces, or the use of non-linear materials (e.g., nickel, steel, or ferrite). If a non-linearity becomes substantial over time, the passive intermodulation generated therefrom could fall into one of the receive bands of the cell site. In this regard, a cell site falling victim to passive intermodulation in a receive band could lead to dropped calls, access failures, slower data rates, and the like.

Detecting and mitigating PIM interference can be costly, however, particularly due to costs associated with PIM detection, component repair or replacement, and signal downtime. While traditional methods deal with PIM interference in a variety of ways, such methods require downtime of the signal transmitting components (e.g., the antenna) to eliminate the interference.

Utilizing embodiments hereof, passive intermodulation (PIM) interference within a receive band of a multiport antenna can be automatically detected and mitigated without interrupting radio frequency (RF) transmissions. In this regard, a base station or component thereof can be configured to detect when signals corresponding to a port of a multiport antenna is receiving signal interference due to passive intermodulation. In embodiments, detection of passive intermodulation can take place in a base station's signal processing unit or base band unit (BBU). In further embodiments, passive intermodulation corresponding to a port of a multiport antenna can be dynamically mitigated by the base station or a component thereof. Mitigation of passive intermodulation can be facilitated by detecting which port of a multiport antenna is affected by the passive intermodulation, and then instructing the base station or a component thereof (e.g., the radio or receiver) to ignore at least a portion (i.e., the frequency affected by the PIM) of the receive signals corresponding to the affected port. In this way, by nature of having receive diversity with the multiport antenna, the remaining ports of the antenna that are not affected by passive intermodulation can still receive signals in the shared frequency or band, while the signals affected by the PIM are simply ignored.

Accordingly, in one aspect of the present disclosure, an embodiment is directed to a computer-implemented method for mitigating signal interference attributed to passive intermodulation. The method includes monitoring system noise associated with a first port of an antenna having a plurality of ports. Each port of the antenna can be configured to communicate with at least signals associated with or corresponding to a first band or frequency. The ports are also configured to communicate the signals to a receiver. At least the first port from the plurality of ports can be configured to communicate signals associated with or corresponding to a second band or frequency. The method also includes detecting, while monitoring system noise associated with the first port of the antenna, a threshold variation or more from a baseline of system noise associated with the first port of the antenna. The method further includes signaling the receiver to ignore the signals communicated through the first port of the antenna that are associated with or corresponding to the first band or frequency. Signaling the receiver to ignore the signals is conducted in accordance with detecting at least the threshold variation in the monitored system noise associated with the first port of the antenna.

In another aspect of the present disclosure, an embodiment is directed to one or more computer-readable storage media having computer-executable instructions embodied thereon that, when executed, perform a method for mitigating signal interference attributed to passive intermodulation. The method includes determining a baseline of system noise associated with a first port of an antenna having a plurality of ports. Each port of the antenna can be configured to communicate at least signals associated with or corresponding to a first band or frequency through the first port to a receiver. At least the first port of the antenna can further be configured to communicate signals associated with or corresponding to a second band or frequency there through to the receiver. The baseline of system noise can be based on an average of a plurality of system noise measurements corresponding to the first port taken on either a predefined interval basis (e.g., once an hour) or a continuous basis (e.g., every millisecond), over a predetermined period of time (e.g., a twenty-four hour period). The method also includes detecting a threshold variation or greater from the baseline of system noise associated with the first port of the antenna. The method further includes signaling the receiver (i.e., sending an instruction thereto) to ignore the signals, associated with or corresponding to the first band or frequency, received through the first port of the antenna in accordance with detecting at least the threshold variation from the baseline of system noise associated with the first port of the antenna.

In yet another aspect, a system for mitigating signal interference attributed to passive intermodulation is provided. The system includes, among other things, a PIM detection and mitigation component. The PIM detecting and mitigation component can include a system noise-measuring component, a threshold-monitoring component, and a receiver controller component. The system noise-measuring component can be configured to monitor system noise associated with a first port of an antenna having a plurality of ports (i.e., a multiport antenna). Each port of the antenna can be configured to communicate to a receiver at least signals associated with or corresponding to a first band or frequency. The first port can also be configured to communicate to the receiver signals associated with or corresponding to a second band or frequency. The threshold-monitoring component can be configured to detect at least a threshold variation in the monitored system noise associated with the first port of the antenna. The threshold variation is measured in comparison to a baseline of system noise associated with the first port of the antenna. The threshold variation also corresponds to passive intermodulation interference that is formed from at least parts of the signals associated with or corresponding to the first and second bands or frequencies.

The receiver controller component can be configured to instruct the receiver to ignore, in accordance with detecting the at least a threshold variation in the monitored system noise associated with the first port of the antenna, the signals communicated to the receiver through the first port that are associated with or correspond to the first band or frequency.

Figure 2:
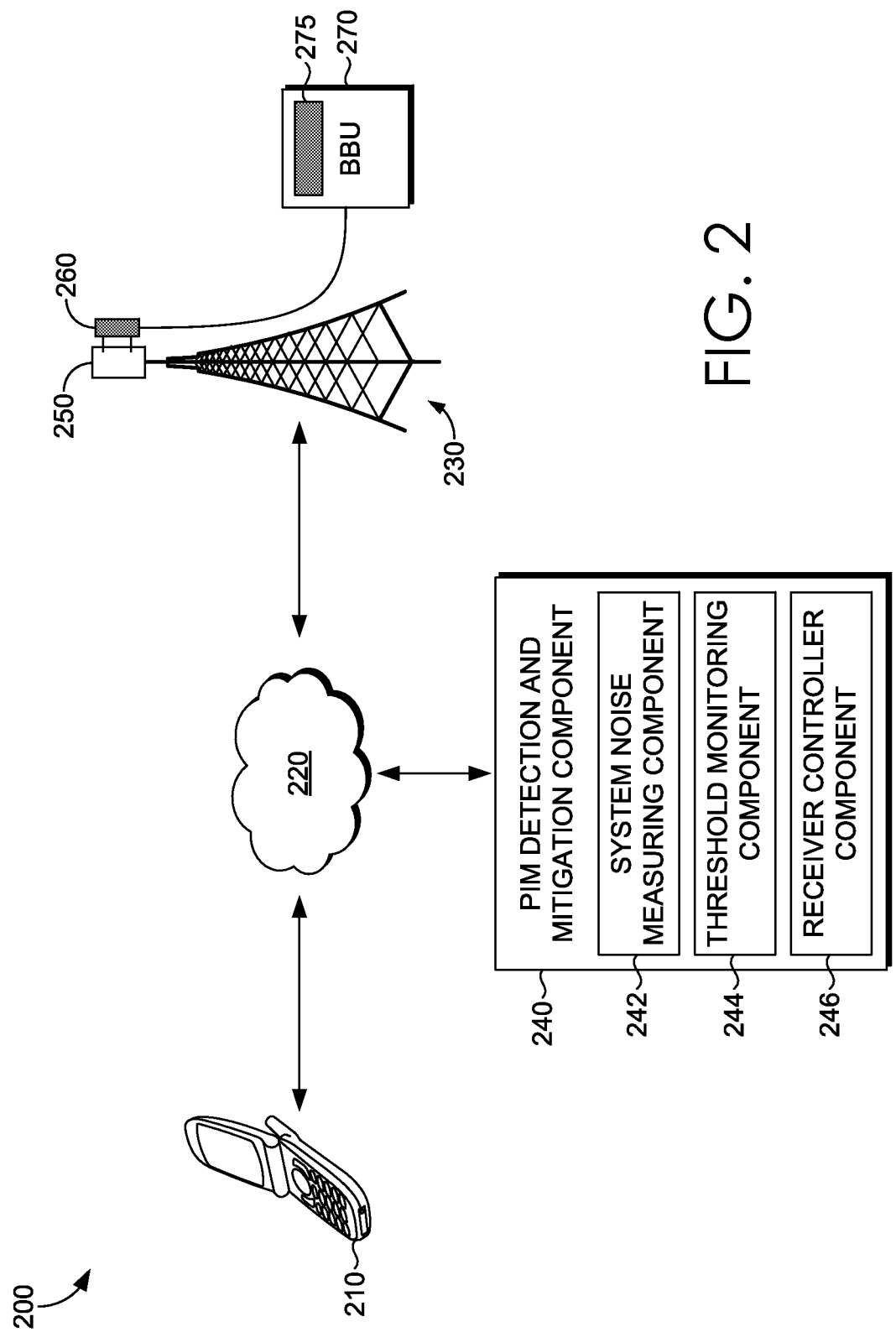
FIG. 2 is a schematic of an exemplary communications environment suitable for use in embodiments of the present disclosure.

Turning now to FIG. 2, an exemplary network environment suitable for use in implementing embodiments of the present disclosure is illustrated and designated generally as a network environment 200. Network environment 200 is but one example of a suitable network environment and is not intended to suggest any limitations as to the scope of use or functionality of embodiments described herein. Neither should the network environment be interpreted as having any dependency or requirement relating to any one or combination of components illustrated.

In the network environment 200, one or more mobile devices 210 may communicate with other devices, such as mobile devices, servers, etc. The mobile device 210 may take on a variety of forms, such as a personal computer (PC), a laptop computer, a tablet, a notebook, a mobile phone, a Smart phone, a personal digital assistant (PDA), or any other device that is capable of wirelessly communicating with the other devices using the network 200. The mobile device 210 may comprise the mobile device 100 of FIG. 1, and as such can include, for example, a display(s), a power source(s) (e.g., a battery), a data store(s), a speaker(s), memory, a buffer(s), an antenna, and the like. In embodiments, the mobile device 210 comprises a wireless or mobile device with which a wireless-telecommunication-network(s) (e.g., the network environment 200) can be utilized for communication (e.g., voice and/or data communication). In this regard, the mobile device 210 can be any mobile computing device that communicates by way of, for example, a 3G or 4G network.

The mobile device 210 can utilize a network 220 to communicate with other computing devices (e.g., a mobile device(s), a server(s), a personal computer(s), etc.) and/or with a base station such as the base station 230. In embodiments, the network 220 is a telecommunications network(s), or a portion thereof. A telecommunications network might include an array of devices or components, some of which are not shown so as to not obscure more relevant aspects of the embodiments described herein. Components such as terminals, links, and nodes (as well as other components) can provide connectivity in some embodiments. The network 220 can include multiple networks, as well as being a network of networks, but is shown in more simple form so as to not obscure other aspects of the present disclosure. The network 220 can be part of a telecommunications network that connects subscribers or users to their immediate service provider. In embodiments, the network 220 can be associated with a telecommunications provider that provides services to mobile devices, such as the mobile device 210. For example, the network 220 may provide voice and/or data services to mobile devices or corresponding users that are registered to utilize the services provided by a telecommunications provider. The network 220 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112A of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

Although network environment 200 is illustrated with single components, as can be appreciated, the components are scalable and any number of each of the components may exist in the network environment. Further, although not illustrated herein, additional components or combination of components may exist within the network environment 200. While FIG. 2 is generally described in relation to PIM mitigation, as can be appreciated, any other base station-controlled or operated component(s) are also contemplated in accordance with embodiments described herein.

The network environment 200 also includes the base station 230 and a PIM detection and mitigation component 240. The base station 230 refers to a tower that facilitates wireless communication between user devices. Depending on the wireless communication technologies employed by the network, a communication tower might be referred to as or include a base transceiver station (BTS), a radio base station (RBS), a base station (BS), a node B (in 3G networks), or an eNodeB (in LTE network). The base station 230 may be associated with the network 220 and communicate with, for instance, the mobile device 210. The communication may involve receiving RF signals from the mobile device 210 using one or more antennas, such as antenna 250, and transmitting RF signals to the user device 210 using the one or more antennas 250, as will be described in more detail with reference to FIG. 3. The base station 230 can be configured to transmit and receive RF signals that each correspond to one or more bands/frequencies, depending at least on configurations of the one or more antennas 250. In this regard, the base station 230 may have a number of associated RF signal bands/frequencies being communicated to and from the base station 230. The base station 230 can include a radio or receiver 260 configured to at least receive and modulate the signals received through the antenna 250. The radio/receiver 260 can further communicate the received signals to a ground cabinet 270 or sub-component thereof, for instance, a base band unit (BBU) 275, as will be described in more detail herein.

The components of network environment 200 have been illustrated separately but may in fact, be integrated into a single component. For instance, the PIM detection and mitigation component 240 may be a component of the base station 230, such as a radio, a base band unit (BBU), a digital signal processor (DSP), or the like.

The PIM detection and mitigation component 240 includes at least a system noise-measuring component 242, a threshold-monitoring component 244, and a receiver controller component 246. The system noise-measuring component 242 is configured to, among other things, measure system noise associated with base station 230 and/or its one or more antennas at any given time. More specifically, the system noise-measuring component 242 may be configured to monitor and/or measure local RF signals and/or interfering RF signals within the communication range. In some aspects, the system noise-measuring component 242 may be configured to detect and/or measure various forms of signal data (i.e., signal-to-noise ratios, reverse-noise-rise values, etc.) associated with the base station 230 by employing various signal analyzing components as may be familiar to one of ordinary skill in the art. In some aspects, the system noise measuring component 242 may be configured to receive measurements of signal data associated with the base station 230 from a signal data measuring module (not shown), and monitor, measure, and/or analyze signal data as it is received from the signal data measuring module. In embodiments described herein, the system noise-measuring component 242 can be configured to measure system noise associated with one or more ports and/or paths of the one or more antennas 250.

In some embodiments, the system noise-measuring component 242 can be further configured to determine a baseline of system noise associated with one or more ports and/or paths of the one or more antennas 250. The baseline of system noise can be based on one or more measurements of system noise corresponding to one or more ports and/or paths of an antenna. In more detail, the baseline of system noise can be based on an average of the plurality of system noise measurements corresponding to one or more ports of an antenna. The plurality of system noise measurements can include unique measurements of system noise corresponding to one or more ports, wherein the measurements are taken in a predefined interval basis (e.g., once an hour) or in a continuous basis (e.g., constant measuring). In one embodiment, the baseline of system noise can be determined from the plurality of measurements by averaging the measurement values (i.e., the sum of measurement values over the number of measurements taken).

The threshold monitoring component 244 of the PIM detection and mitigation component is configured to at least detect a threshold variation in the monitored system noise. In embodiments, the monitored system noise can correspond to one or more antenna ports and/or paths, as described with respect to the system noise-measuring component 242 above. The threshold variation can be any manually predetermined or dynamically determined value that represents a tolerable amount of signal noise variation apart from the system noise baseline. In essence, the threshold variation represents a tolerable amount of change in signal noise before establishing the probable presence of passive intermodulation in the RF path. By way of example only, if the system noise measuring component 242 determined that the system noise baseline for Port 1 of 4 of an antenna was −100 dBm, a threshold variation of 2 dB would provide that if the system noise associated with Port 1 of 4 ever exceeds −98 dBm, passive intermodulation is likely present in the RF path associated with the port. In this regard, if the signal noise ever exceeds −98 dB, the threshold-monitoring component 244 will detect the threshold variation from the baseline of system noise, thereby initiating steps for mitigating the likely presence of passive intermodulation interference in the corresponding RF path. The threshold-monitoring component 244 may then perform steps or cause another component or module, such as the receiver controller component 246, to perform steps to mitigate the passive intermodulation interference.

The receiver controller component 246 of the PIM detection and mitigation component 240 can be configured to interface with a receiver and further configured to instruct the receiver (i.e., by sending signals and/or instructions thereto) to receive or block incoming signals based on measurements of the system noise. In more detail, the receiver controller component 246 can be configured to send signals and/or instructions to the receiver, directly or indirectly (i.e., through a network), to ignore signals associated with a particular band or frequency. By way of example, if the threshold-monitoring component 244 detected that the system noise associated with one or more ports exceeded the system noise baseline by the threshold variation or a value greater than the threshold variation, the receiver controller component 246 can be configured to signal the receiver to ignore signals associated with one or more frequency/band signals communicated through the one or more ports, essentially blocking off the interfering signals transmitting therethrough.

In various configurations, the receiver controller component 246 can determine which signals the receiver is to ignore based on the frequencies being transmitted and/or received through each port. In embodiments, at least the common receive frequency or band (e.g., LTE frequency 1') of the affected port will be blocked in accordance with the detection of at least a threshold variation in the monitored system noise, as was described in more detail above with respect to multiport antennas and diversity reception. It is contemplated that the common receive frequency that is blocked from the affected port will still be received through the other ports of the antenna, by virtue of the antennas receive diversity configuration. In this way, the common receive frequency will still be received by the receiver without interference due to passive intermodulation.

Figure 3:
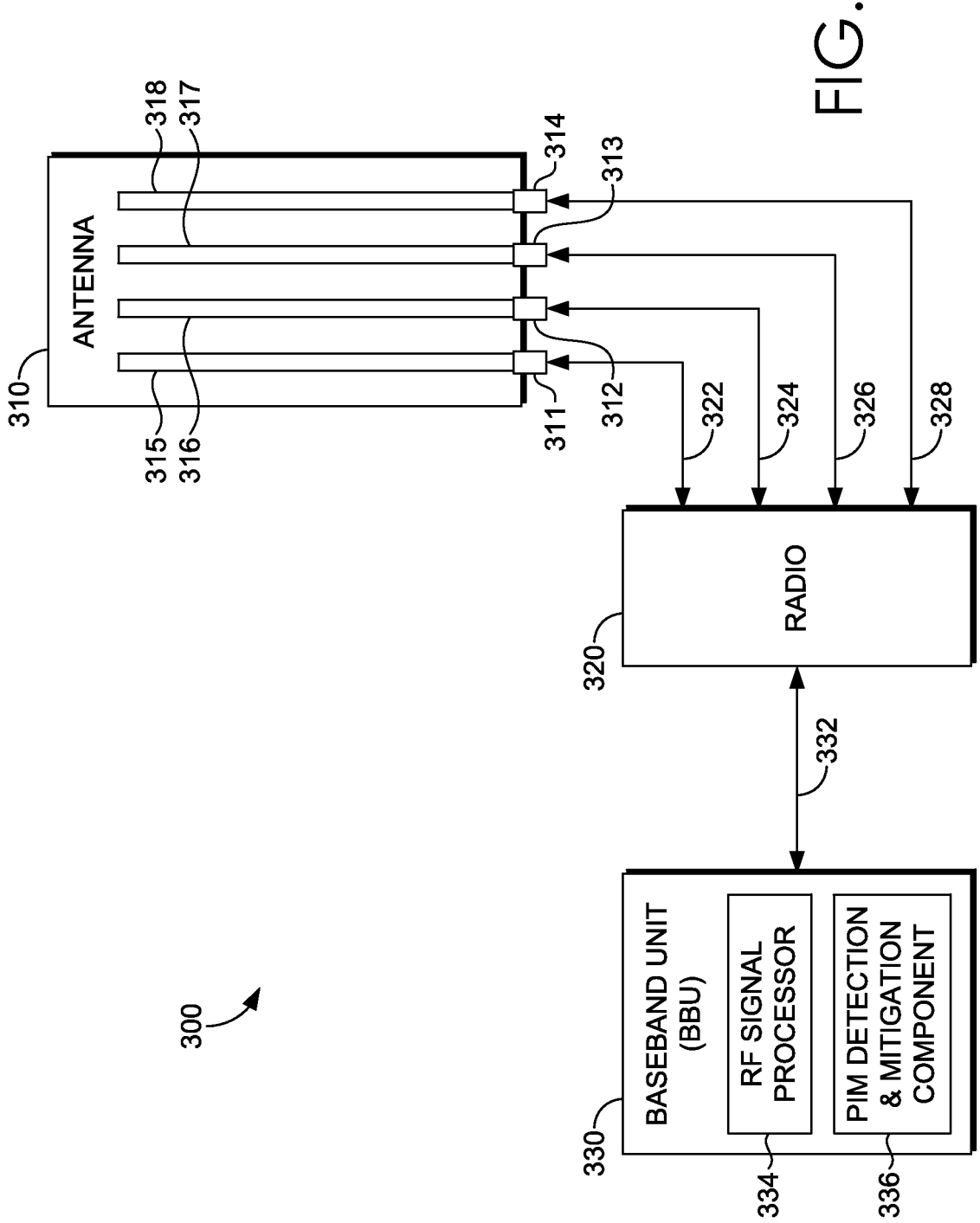
FIG. 3 is a schematic of an exemplary PIM detection and mitigation system in accordance with an embodiment of the present disclosure.

Moving now to FIG. 3, in reference generally to base station 230 and antenna 250 of FIG. 2, an exemplary configuration of a system 300 configured to mitigate signal interference in a receive band of a multiband antenna due to passive intermodulation (PIM) is provided. The illustrated antenna 310 is a multiport antenna 310 having a plurality of ports 311,312,313,314 each independently coupled to an antenna element 315,316,317,318. Moreover, each port 311, 312,313,314, is coupled to a radio 320 (herein also referred to as the "receiver") configured to transmit and/or modulate receive signals by way of the antenna 310. Each port 311,312,313,314 is coupled to the radio 320 through a plurality of independent paths 322,324,326,328 configured to communicate the signals between the antenna ports 311,312,313,314 and the radio 320. It is contemplated that the paths and any other connections between the illustrated components can be facilitated through a direct wired connection (e.g., fiber optics or electrical wiring) or an indirect connection (e.g., through a network router).

While the exemplary configuration embodies four antenna elements, ports, and paths, it is contemplated that any number of elements, ports, and paths may be employed while remaining within the scope of the present disclosure. The radio 320 can be configured to receive one or more signals communicated through the paths 322,324,326,328 and further communicate the signals to another component of the base station 230, for instance, a baseband unit (BBU) 330 that may be stored in a ground cabinet (not shown) for the base station 230.

The baseband unit 330 can include various components configured to analyze the signals being transmitted thereto from the radio 320 by one or more connections 332 (e.g., electrical wire or fiber optic). The baseband unit can include, among other things, a RF signal processor 334, or the like (e.g., digital signal processor), configured to analyze signals communicated from the radio 320. The RF signal processor 334 may include the ability to, among other things, measure characteristics of the signals being transmitted thereto. As such, the baseband unit may also include a PIM detection and mitigation component 336, as described in accordance with the present disclosure. The PIM detection and mitigation component 336 may be provided in a separate component, or included as a subcomponent or feature (i.e., executable code) of the baseband unit 330 or RF signal processor 334. Further, while the illustrated embodiment shows the PIM detection and mitigation component 336 as a subcomponent of the baseband unit 330, it is also contemplated that the PIM detection and mitigation component 336 can also be a subcomponent or feature of the radio 320.

As was described herein above, the PIM detection and mitigation component 336 can be configured to monitor system noise associated with one or more ports 311,312, 313,314 of antenna 310. The PIM detection and mitigation component 336 can determine a baseline of system noise associated with each of the one or more ports 311,312,313, 314 to compare future variations in system noise with the intention to detect passive intermodulation interference in the signal data. By way of example only, the first port 311, second port 312, third port 313, and fourth port 314 can each be configured to transmit in a first transmit band or frequency (e.g., LTE frequency 1) and each configured to receive in a corresponding first receive band or frequency (e.g., LTE frequency 1'). In this way, the antenna 310 and each port 311,312,313,314 can be configured for receive diversity with respect to the first receive band.

Further, by way of example only, the first port 311 can be operable to transmit and/or receive in a secondary band or frequency. In more detail, the first port 311 can be configured to further transmit in a second transmit band or frequency (e.g., CDMA frequency 1) and configured to further receive in a corresponding second receive band or frequency (e.g., CDMA frequency 1'). Similarly, the second port 312, third port 313, and fourth port 314, can each be configured to further transmit and/or receive in a third, fourth, or fifth transmit/receive band or frequency, respectively. While it is contemplated that each port is associated with the first transmit band or frequency, and further associated with a unique transmit band or frequency, it is possible that more than one of the plurality of ports is associated with the same primary and secondary transmit and receive bands or frequencies.

In accordance with an embodiment of the present disclosure, the first port 311 transmitting at the first transmit band (e.g., LTE frequency 1) and also at the second transmit band (e.g., CDMA frequency 1) could immediately or eventually introduce passive intermodulation in a receive band associated with the first port 311. More particularly, depending on the frequency at which the first transmit band and second transmit band operate, passive intermodulation interference generated at least in part due to the combination of the first and second transmit bands can interfere with the first receive band associated with the first port 311. In this regard, the signal noise associated with the first port 311 and affected by passive intermodulation would exceed the signal noise baseline associated with the first port 311. Embodiments of the present disclosure provide that, in accordance with detecting that the signal noise baseline associated with a port exceeds a threshold variation, the receiver or radio 320 is instructed to ignore at least one of the signals associated with the port exceeding the threshold variation. In a preferred embodiment, the signal that the radio 320 will ignore is the one that falls in the first receive band (e.g., LTE frequency 1'). In this way, by way of diversity reception, the remaining, unaffected ports can continue to receive signals associated with the first receive band (e.g., LTE frequency 1') without sacrificing signal deterioration due to passive intermodulation. Further, by simply mitigating the passive intermodulation interference in this way, downtime due to passive intermodulation testing, maintenance, or repair, is substantially reduced.

Turning now to FIGS. 4 and 5, methods for mitigating signal interference attributed to passive intermodulation is provided. In particular, FIGS. 4 and 5 show flow diagrams illustrating methods to mitigate signal interference attributed to passive intermodulation at a base station, in accordance with embodiments of the present disclosure. It will be understood by those of ordinary skill in the art that the order of steps shown in the method 400 of FIG. 4, method 500 of FIG. 5 are not meant to limit the scope of the present disclosures in any way and, in fact, the steps may occur in a variety of different sequences within embodiments hereof. Any and all such variations, and any combination thereof, are contemplated to be within the scope of embodiments described herein.

With initial reference to FIG. 4, in embodiments, method 400 can be performed at a base station, such as base station 230 of FIG. 2. More specifically, method 400 might be performed by a PIM detection and mitigation component 240 of FIG. 2. Initially, as indicated at block 410, system noise associated with a first port of an antenna having a plurality of ports (i.e., a multiport antenna) is monitored. As was described herein, each port of the antenna is configured to communicate at least first band signals (e.g., LTE signals) to a receiver. The first port of the antenna is also configured to communicate second band signals (e.g. CDMA signals) to the receiver. At block 420, a threshold variation or greater is detected in the monitored system noise that is associated with the first port of the antenna. The threshold variation is compared to a baseline of system noise associated with the first port of the antenna. At block 430, the receiver or radio is signaled to ignore the first band signals communicated thereto (e.g., received by the radio) through the first port of the antenna. The first band signals are ignored in accordance with detecting the threshold variation or greater in the monitored system noise associated with the first port of the antenna.

Turning now to FIG. 5, in embodiments, method 500 can be performed at a base station, such as base station 230 of FIG. 2. Initially, as indicated at block 510, a baseline of system noise associated with a first port of an antenna having a plurality of ports (e.g., a multiport antenna) is determined. As was described herein, each port of the antenna is configured to communicate at least signals associated with a first frequency or band to a receiver. At least the first port of the antenna is further configured to communicate signals associated with a second frequency or band to the receiver. The baseline of system noise can be based on an average of a plurality of system noise measurements corresponding to the first port, each of the system noise measurements being taken on one of a predefined interval basis or on a continuous basis. At block 520, a threshold variation (or more) of system noise greater than the baseline of system noise associated with the first port of the antenna is detected. At block 530, the receiver can receive a signal and/or instructions (for instance, by internal logic or an external component such as the BBU) to ignore the signals associated with the first band or frequency received through the first port of the antenna. The signals are sent to the receiver in accordance with a threshold variation from the baseline of system noise associated with the first port of the antenna is detected.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computer-implemented method for mitigating signal interference attributed to passive intermodulation (PIM), the method comprising:
monitoring, via a radio coupled to a first antenna element having a single port, each of a first receive signal and a second receive signal, wherein the first receive signal is associated with a first receive frequency band and the second receive signal is associated with a second receive frequency band, wherein the first antenna element is additionally configured to transmit one or more signals on a first transmit frequency band, and wherein the first receive frequency band is different than the second receive frequency band;
determining a noise level associated with the first receive frequency band exceeds a threshold variation from a determined noise baseline, the threshold variation being indicative of PIM caused by a combination of the first receive signal and the second receive signal; and
based on said determination, blocking the first receive signal.

2. The computer-implemented method of claim 1, wherein the noise baseline associated with the single port is determined based on a determined average of noise measurements monitored via the single port.

3. The computer-implemented method of claim 1, wherein the single port is coupled to a corresponding element of a plurality of elements associated with an antenna array.

4. The computer-implemented method of claim 3, wherein the corresponding element is configured to receive the first receive signal associated with the first receive frequency band and the second receive signal associated with the corresponding second receive frequency band.

5. The computer-implemented method of claim 1, wherein the radio is further coupled to a second antenna element having a single second port, and is configured to monitor each of the first receive signal and a third receive signal, wherein the third receive signal is associated with a third receive frequency band, the third receive frequency band being different than each of the first and second receive frequency bands.

6. The computer-implemented of claim 5, wherein the first antenna element is additionally configured to transmit on a second frequency band.

7. The computer-implemented method of claim 6, wherein the second antenna element is additionally configured to transmit on a third transmit frequency band, the third transmit frequency band being different than each of the first and second transmit frequency bands.

8. The computer-implemented method of claim 7, wherein the second antenna element is additionally configured to transmit on the first transmit frequency band.

9. One or more non-transitory computer-readable storage media having computer-executable instructions embodied thereon that, when executed, perform a method for mitigating signal interference attributed to passive intermodulation (PIM), the method comprising:
determining a baseline of noise associated with a single port of a first antenna element, wherein the single port is configured to receive a first receive signal and a second receive signal where the first receive signal is associated with a first receive frequency band, and the second receive signal is associated with a second receive frequency band, wherein the baseline of the noise associated with the single port is determined based on a determined average of obtained single port noise measurements;
based on the signals received via the single port, determining that the monitored noise associated with the single port exceeds a threshold variation from the determined noise associated with the single port, the threshold variation being indicative of PIM caused by a combination of the first receive signal and the second receive signal; and
based on said determination, blocking the first receive signal.

10. The one or more non-transitory computer-readable storage media of claim 9, wherein the first receive frequency band corresponds to an OFDM cellular broadband communication technology and the second receive frequency band corresponds to a CDMA cellular broadband communication technology.

11. A computerized system for mitigating signal interference attributed to passive intermodulation (PIM), the system comprising:
a PIM detection and mitigation component including:
a noise measuring component configured to monitor noise associated with a single port of a first antenna element, wherein the single port is configured to receive a first receive signal and a second receive signal, the first receive signal is associated with a first receive frequency band, and the second receive signal is associated with a second receive frequency second band, wherein the first antenna element is additionally configured to transmit one or more signals on each of the first transmit frequency band, and wherein the first receive frequency band is different than the second receive frequency band;
a threshold monitoring component configured to detect, for the single port, at least a threshold variation in the monitored noise from a determined baseline of the noise associated with the single port, the threshold variation being indicative of PIM caused by a combination of the first receive signal and the second receive signal; and
a radio controller component configured to instruct a radio to block, for the single port, the first receive signal based on the said determination.

12. The system of claim 11, wherein the baseline of the noise associated with the single port is determined based on a determined average of obtained noise measurements corresponding to the single port.

* * * * *